United States Patent Office 3,375,084
Patented Mar. 26, 1968

3,375,084
METHOD FOR THE PREPARATION OF COMPLEX FLUORONITROSONIUM SALTS
Stephen J. Kuhn, Sarnia, Ontario, Canada, assignor to The Dow Chemical Company, Midland, Mich., a corporation of Delaware
No Drawing. Filed Dec. 19, 1963, Ser. No. 331,959
6 Claims. (Cl. 23—356)

ABSTRACT OF THE DISCLOSURE

A process for preparing complex nitrosonium salts which comprises introducing nitrosylchloride and anhydrous hydrogen fluoride into a solvent for the reactants along with a Lewis acid fluoride, agitating the mixture at a temperature below 20° C. whereby the corresponding nitrosonium salt product precipitates in the reaction mass and separating this salt product from the residual reaction mixture.

---

This invention relates to fluoronitrosonium salts and, more particularly, is concerned with a novel method for the preparation of high purity complex fluoronitrosonium salts.

The existence and characteristics of solid fluoronitrosonium salts such as nitrosonium tetrafluoroborate, nitrosonium hexafluorophosphate and nitrosonium hexafluoroantimonate, for example, have been known for some time.

These salts, at present, ordinarily are prepared by one of the following techniques:

(1) Nitric oxide or nitrosyl chloride together with bromine trifluoride acts on a suitable material such as a metal, oxide or oxy-salt of a halide which is capable of reacting on the bromine trifluoride either as a Lewis acid or base [Woolf, J. Chem. Soc., 1053 (1950)];

(2) Preparation of nitrosyl fluoride and subsequent reaction of this compound with a suitable Lewis acid, e.g., a non-metallic fluoride [G. Blaz et al., Z. Anorg. Allgem. Chem., 151, 219 (1927), 217, 161 (1934)];

(3) Reaction of dinitrogen oxide with fluoboric acid to produce nitrosonium tetrafluoroborate [G. Blaz et al., Z. Anorg. Allgem. Chem., 151, 219 (1927), 217, 161 (1934)];

(4) Adding a mixture of anhydrous hydrofluoric acid and an appropriate fluoride compound to a preparation of dinitrogen tetroxide dissolved in nitromethane [S. Andreas, J. Org. Chem., 27, 4157 (1962)].

All of these listed processes for the preparation of nitrosonium salts suffer from one or more of the following defects and/or difficulties: the operations are multistep; some nitrogen oxide based starting materials, e.g., NOF, are expensive and not commercially available and require more than one mole of Lewis acid fluoride per mole nitrosonium salt; the resulting nitrosonium salts are relatively impure; complicated reactor equipment is needed; and the reactions are both difficult and somewhat dangerous to carry out.

Thus, it is an object of the present invention to provide a new and novel process for the preparation of high purity complex fluoronitrosonium salts.

It is an additional object of the present invention to provide a safe, straightforward one-step method for the preparation of complex fluoronitrosonium salts which permits the use of readily available commercial materials as reactants.

It is a further object of the present invention to provide a method for preparing nitrosonium salts which does not require complicated reaction apparatus nor the prior preparation of nitrosyl fluoride.

These and other objects and advantages of the method of the instant invention will become apparent from the detailed description thereof presented hereinafter.

In general, the method of the instant invention is comprised of introducing nitrosylchloride and anhydrous hydrogen fluoride into an appropriate solvent along with a Lewis acid fluoride. The reaction mixture is agitated while being maintained at a temperature ranging from about the freezing point of the mixture to about 20° C. The resulting nitrosonium salt product which precipitates during the course of the reaction then is separated from the reaction mixture. The term "Lewis acid fluoride," as used herein, refers to those fluorine-containing materials capable of accepting a pair of electrons in the formation of a bond as set forth by the Lewis theory of acids and bases.

Ordinarily, in the instant invention method, the nitrosylchloride and anhydrous hydrogen fluoride will be carried in a nitroalkane (e.g., nitromethane, nitroethane, nitropropane, nitrobutane) or sulfur dioxide solvent. However, use of these latter compounds is not essential as an excess of the anhydrous hydrogen fluoride itself can be used as a solvent for the reactants.

Preferably, as indicated heretofore, the Lewis acid substance employed in the reaction to form the salt will be a fluoride compound and ordinarily will be a polyfluoride compound of the general formula, $MF_n$, wherein the second member M is a metal, metalloid or non-metallic species selected from Groups III to V, inclusive, of the Periodic Table and $n$ is an integer equal to the valence state of the substance M in the polyfluoride. Examples of a few useful Lewis acid nitrosonium salt formers are boron trifluoride, phosphorus pentafluoride, silicon tetrafluoride, stannic fluoride, antimony pentafluoride, arsenic pentafluoride and the like.

The anhydrous hydrogen fluoride to be used preferably is selected from those substantially anhydrous materials which assay from about 98 to about 100 percent hydrogen fluoride.

Nitrosylchloride, one of the starting materials of the method of this invention, is commercially available or can be prepared easily and in good yield by the interaction of nitric oxide and chlorine.

In actual operation of the method, the relative molar proportion of nitrosylchloride to anhydrous hydrogen fluoride in the initial solution is preferably about 1:1. The use of excess hydrogen fluoride has no advantage. If hydrogen fluoride is also used as solvent, the mole ratio of HF:NOCl ranges from about 2 to about 100. Ordinarily, reaction mixtures utilizing about stoichiometric quantities of hydrogen fluoride and nitrosylchloride will be employed. The ratio of the Lewis acid to the nitrosylchloride ranges from about 1 to about 1.5 times the stoichiometric molar quantities needed for salt production.

The amount of either a nitroalkane containing from 1 to 4 carbon atoms, sulfur dioxide or excess hydrogen fluoride solvent to be used is not critical. Generally, the amount of solvent utilized will be up to about 300 grams per mole of the reactants present.

The upper operative limit of temperature is the boiling point of the hydrogen fluoride, about 20° C. at atmospheric pressure, and the lower limit is the freezing point of the reaction mixture, i.e., from about minus 30° to about minus 50° C. A preferred operating temperature range is from about minus 30° C. to about 0° C. If higher pressures are employed, correspondingly higher temperatures may be employed.

The process can be carried out in reactor vessels or flasks of silica, polyethylene, stainless steel or other materials which do not undergo a prohibitive amount of corrosive attack in the presence of the reactants. Control of the reaction temperature within the desired limits can be achieved through the use of a reactor with internal cooling means or by coupling an external cooling means to a given reactor.

The solid nitrosonium salts as produced are of a very high purity. These can be removed from the reaction mixture by conventional means such as filtration, centrifugation and the like, and then dried directly. However, if desired, the separated salts can be washed with a small amount of one of the aforementioned solvents and any residual wash material then simply removed under reduced pressure.

The nitrosonium salts find use as nitrosating agents and diazotizing agents especially if anhydrous media are required. The products produced by the method of the instant invention are especially suitable for any process or utility requiring extremely high purity nitrosonium salts.

The following examples will serve to further illustrate the method of the present invention but are not meant to limit it thereto.

*Example I*

A solution of 0.5 mole of nitrosylchloride and 0.5 mole of anhydrous hydrogen fluoride in 150 grams of liquid sulfur dioxide was placed into a silica flask. 0.5 mole of antimony pentafluoride was added to and dissolved in said solution while said solution was vigorously stirred. The temperature of the mixture was maintained within the range of from about minus 30° to about minus 15° C. As this addition was being made, a white, solid precipitate of nitrosonium hexafluoroantimonate precipitated in the reaction flask. After the addition of antimony pentafluoride was completed, the sulfur dioxide solvent was evaporated by maintaining the mixture at a temperature of from about minus 10° to about 0° C., collected and reused for subsequent reactions. The white solid precipitate was then purified by removing traces of sulfur dioxide or any volatile impurity under reduced pressure. The product yield, based on the amount of nitrosylchloride reactant, was about 100 percent.

*Example II*

Using the same technique and procedural steps as set forth in Example I, 0.5 mole of gaseous boron trifluoride was introduced into a mixture of 0.5 mole of nitrosylchloride and 0.5 mole of anhydrous hydrogen fluoride dissolved in 150 grams of cold nitromethane. In this preparation, the temperature of the reaction mixture was kept between minus 20° C. and 0° C. during the reaction. The white solid precipitate so formed was filtered and washed with low boiling Freon 113 halofluorocarbon. In a number of runs, a product yield of from 98 to 100 percent nitrosonium tetrafluoroborate was obtained.

*Example III*

In a manner similar to that described in Examples I and II, nitrosonium hexafluorophosphate can be prepared by introducting phosphorus pentafluoride into a solution of nitrosylchloride dissolved in anhydrous hydrogen fluoride, the mole ratio of HF:NOCl being within the range of from about 2 to about 100, while maintaining the reaction temperature between from about minus 30° to about plus 10° C., the molar ratio of said phosphorus pentafluoride:nitrosylchloride in the reaction mixture being about 1:1.

In a manner similar to that described in the foregoing experiments, nitrosonium hexafluoroarsenate, hexafluorosilicate, hexafluorostannate and hexafluorophosphate can be produced by reacting substantially stoichiometric quantities of the corresponding Lewis acid fluoride with nitrosylchloride in the presence of excess hydrogen fluoride. As previously mentioned, nitroalkanes or sulfur dioxide may be used as the solvent, thus eliminating the necessity of using more than stoichiometric quantities of hydrogen fluoride in the reaction.

Various modifications may be made in the instant invention without departing from the spirit or scope thereof for it is to be understood that I limit myself only as defined in the appended claims.

What is claimed is:

1. A method for preparing high purity fluoronitrosonium salts which comprises introducing a fluorine-containing Lewis acid substance into a solution of nitrosylchloride and substantially anhydrous hydrogen fluoride dissolved in a solvent selected from the group consisting of nitroalkanes containing from 1 to 4 carbon atoms and sulfur dioxide while maintaining the temperature of the reaction mixture between about 20° C. and the freezing point of the mixture and precipitating the fluoronitrosonium salt in the reaction mixture, said Lewis acid substance being a fluoride compound selected from the group consisting of boron trifluoride, phosphorus pentafluoride, silicon tetrafluoride, stannic fluoride, antimony pentafluoride and arsenic pentafluoride, the relative proportion of said nitrosychloride and substantially anhydrous hydrogen fluoride in the initial reaction solution being about 1:1 on a molar basis and the ratio of said Lewis acid to said nitrosylchloride ranging from about 1 to about 1.5 of the stoichiometric molar quantity needed for salt production.

2. The method in accordance with claim 1 including the additional steps of separating and recovering the fluoronitrosonium salt from the reaction mixture.

3. A method for preparing high purity fluoronitrosonium salts which comprises introducing a Lewis acid fluoride compound into a solution of nitrosylchloride and substantially anhydrous hydrogen fluoride dissolved in a solvent selected from the group consisting of nitroalkanes containing from 1 to 4 carbon atoms and sulfur dioxide while maintaining the reaction temperature between about minus 30° C. and plus 20° C., said Lewis acid being a member selected from the group consisting of boron trifluoride, phosphorus pentafluoride, silicon tetrafluoride, antimony pentafluoride, arsenic pentafluoride and stannic fluoride, the relative proportion of said nitrosylchloride to said hydrogen fluoride in the initial reaction solution being 1:1 on a molar basis and the ratio of said Lewis acid fluoride to said nitrosylchloride ranging from about 1 to about 1.5 of the stoichiometric molar quantity needed for production of said high purity nitrosonium salt.

4. The method in accordance with claim 3 including the additional steps of separating and recovering the fluoronitrosonium salt from the reaction mixture.

5. A method for preparing high purity nitrosonium tetrafluoroborate which comprises:
   (a) introducing boron trifluoride into a solution of nitrosylchloride and substantially anhydrous hydrogen fluoride dissolved in nitromethane while maintaining the reaction temperature between from about minus 20° C. and 0° C., the molar ratio of said boron trifluoride:nitrosylchloride:hydrogen fluoride in the reaction mixture being about 1:1:1; and
   (b) separating the resulting high purity nitrosonium tetrafluoroborate from the reaction mixture.

6. A method for preparing high purity nitrosonium hexafluoroantimonate which comprises:
   (a) introducing antimony pentafluoride into a solution of nitrosylchloride and substantially anhydrous hydogen fluoride dissolved in sulfur dioxide while maintaining the reaction temperature between from about minus 30° to about minus 15° C., the molar ratio of said antimony pentafluoride:nitrosylchloride:hydrogen fluoride in the reaction mixture being about 1:1:1; and (b) separating the resulting high purity nitrosonium hexafluoroantimonate from the reaction mixture.

References Cited

FOREIGN PATENTS 812,247  8/1951  Germany.

OTHER REFERENCES

Maddock et al.: "Recent Aspects of the Inorganic Chemistry of Nitrogen," 1957, pp. 27–28.

Ryuss: "The Chemistry of Fluorine and Its Inorganic Compounds," 1960, pp. 254, 279a.

Seel et al.: "Berichte," vol. 95, pp. 1264–1274 (May 1962).

HILTON WEISSMAN, *Primary Examiner.*